Figure 1:
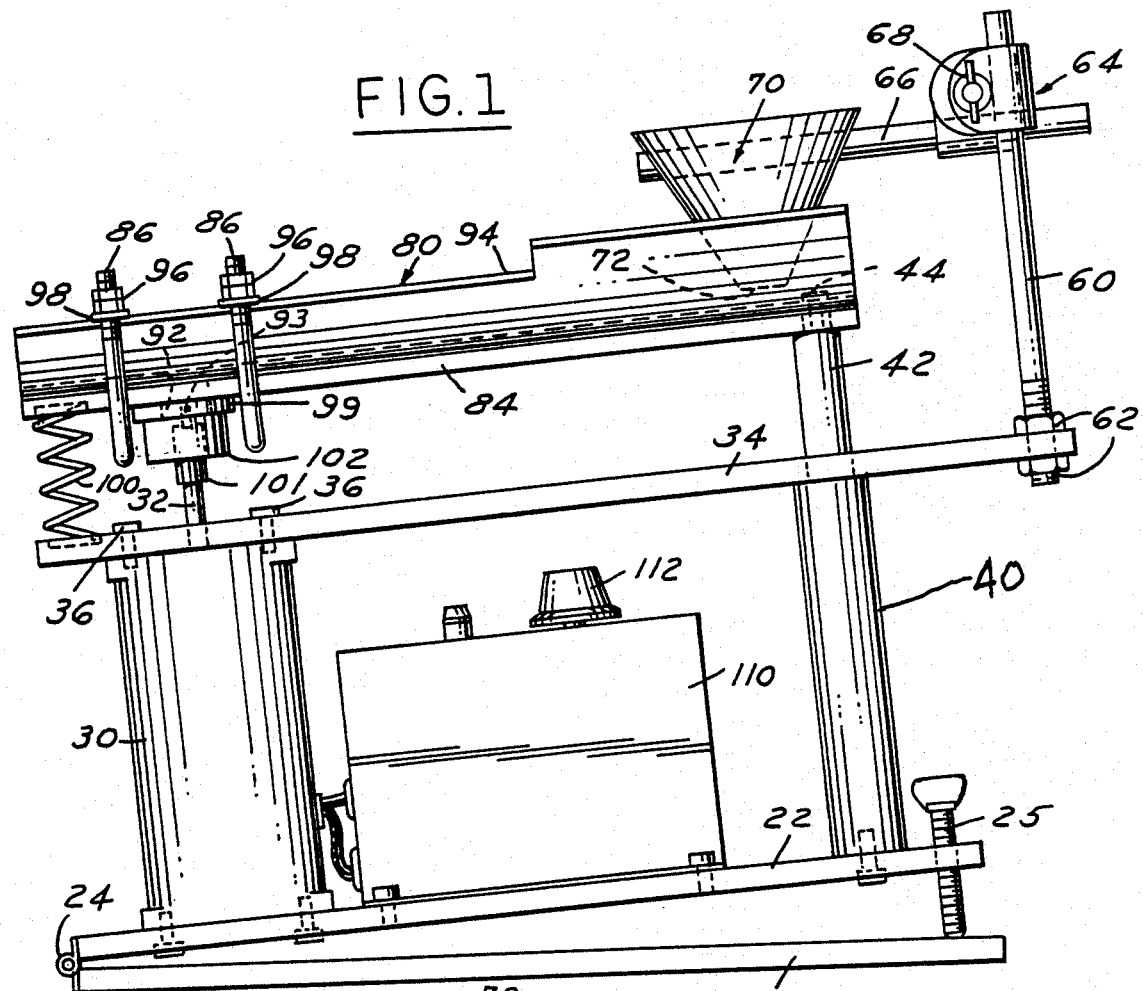

United States Patent [19]

Stein

[11] Patent Number: 4,809,880

[45] Date of Patent: Mar. 7, 1989

[54] DISPENSER FOR FUNGIBLE GOODS

[76] Inventor: Roger P. Stein, 2470 Crooked Lake, Chelsea, Mich. 48118

[21] Appl. No.: 67,205

[22] Filed: Jun. 29, 1987

[51] Int. Cl.$^4$ ............................................. B65H 3/60
[52] U.S. Cl. ..................................... 221/204; 221/258; 74/55; 222/161; 222/199; 222/200; 193/2 B; 198/752
[58] Field of Search ............... 221/200, 204, 285, 156, 221/171, 258; 222/161, 166, 200, 199; 209/539, 920, 921; 198/750, 533, 771, 752; 193/2 B; 74/55, 26

[56] References Cited

U.S. PATENT DOCUMENTS

| | | | |
|---|---|---|---|
| 139,556 | 6/1873 | Eames | 198/752 X |
| 2,337,667 | 12/1943 | Kuehlman | 221/10 |
| 2,445,613 | 7/1948 | Fincher | 74/26 |
| 2,765,900 | 10/1956 | Seabrooke | 193/2 B |
| 2,792,030 | 5/1957 | Wahl | 198/771 X |
| 4,339,029 | 7/1982 | Wilson | 198/750 |
| 4,482,046 | 11/1984 | Kraus | 198/771 |
| 4,552,062 | 11/1985 | Vezzani | 222/199 X |
| 4,684,041 | 8/1987 | Jones et al. | 222/161 |

FOREIGN PATENT DOCUMENTS

| | | | |
|---|---|---|---|
| 4429098 | 11/1969 | Japan | 198/771 |
| 0167812 | 8/1985 | Japan | 198/750 |
| 0948613 | 8/1982 | U.S.S.R. | 193/2 B |

Primary Examiner—Kevin P. Shaver
Assistant Examiner—Gregory L. Huson
Attorney, Agent, or Firm—Barnes, Kisselle, Raisch, Choate, Whittemore & Hulbert

[57] ABSTRACT

A parts dispenser apparatus for fungible parts such as seeds, powder, manufactured parts and the like. A feed hopper is positioned to feed parts to the area of a downwardly inclined trough which is pivoted at a fixed end and driven at the discharge end with a horizontal reciprocating motion. The combined effect of gravity and horizontal reciprocating motion causes the parts to align in the bottom of the trough and discharge one-by-one at the discharge end of the trough. An adjustable eccentric permits control of the reciprocation.

2 Claims, 3 Drawing Sheets

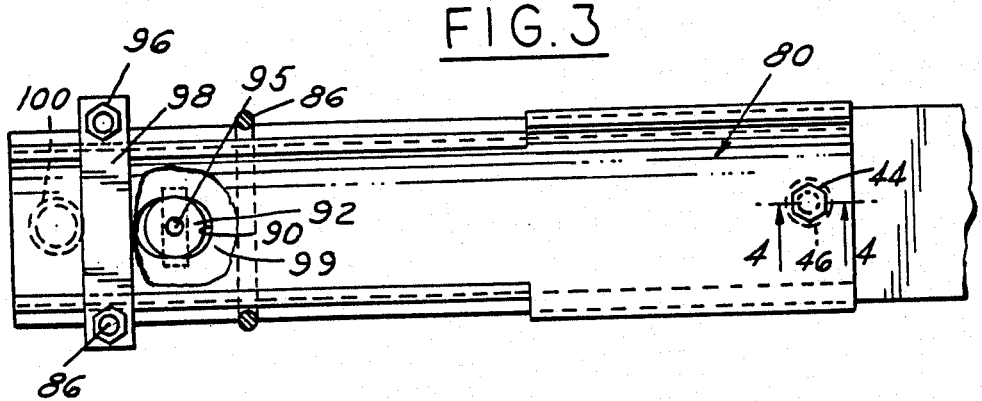
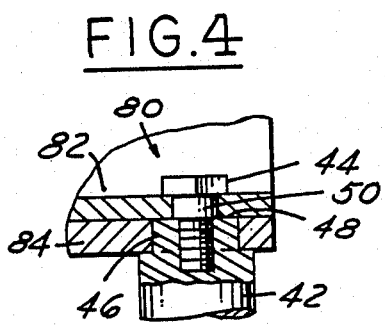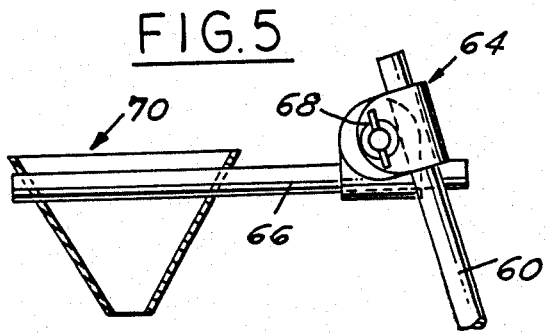

4,809,880

DISPENSER FOR FUNGIBLE GOODS

FIELD OF INVENTION

Apparatus for discharging small parts from a feeding hopper to a one-by-one discharge chute.

BACKGROUND AND OBJECTS OF THE INVENTION

In industry and in agriculture and other fields of endeavor, there very often arises the need for the feeding of small parts on a one-by-one basis. Small nuts, washers, and bolts, as an example, in assembly or packaging procedures, and seeds, pills or powder, as another example, in packaging, strip mounting, and the like.

It is an object of the present invention to provide a versatile machine for part feeding of fungible goods with built-in-adjustable features which allows adaptation to numerous parts varying in size and shape.

The invention utilizes a horizontal reciprocating chute or trough fed from a hopper. Two early U.S. patents in this field are Kuehlman, U.S. Pat. No. 2,337,667 (1943) which uses the shape of a discharge chute to align parts, and Eames, U.S. Pat. No. 139,556 (1873) which is directed to a multiple inclined trough device for separating, concentrating and amalgamating ores. The latter patent uses a horizontal oscillating motion similar to that used in the manual panning of gold to aid the action of gravity a separate mercury and heavy particles from slime.

It is thus an object of the invention to provide a feeding device which has manifold ready adjustments to accommodate and fit the particular requirements as will be evident in the following description and claims wherein the principles of the invention are set forth together with details to permit persons skilled in the art to practice the invention, all in connection with the best mode presently contemplated for the invention.

BRIEF DESCRIPTION OF THE INVENTION

Figure 2:
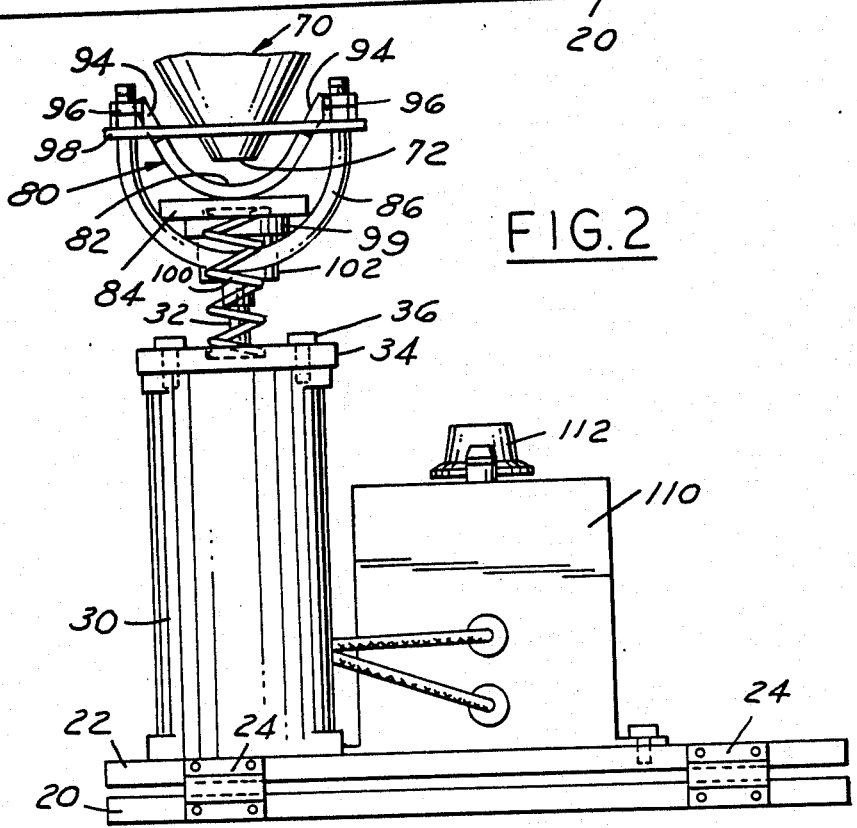

DRAWINGS accompany the disclosure and the various views thereof may be briefly described as:

FIG. 1, a side elevation of the apparatus incorporating the invention showing the respective parts;

FIG. 2, a front view of the apparatus illustrated in FIG. 1;

FIG. 3, a top view of the discharge chute of the apparatus illustrated in FIGS. 1 and 2;

FIG. 4, a sectional view on line 4—4 of FIG. 3; and

FIG. 5, a view of a feed hopper in an adjusted position.

Figure 6:
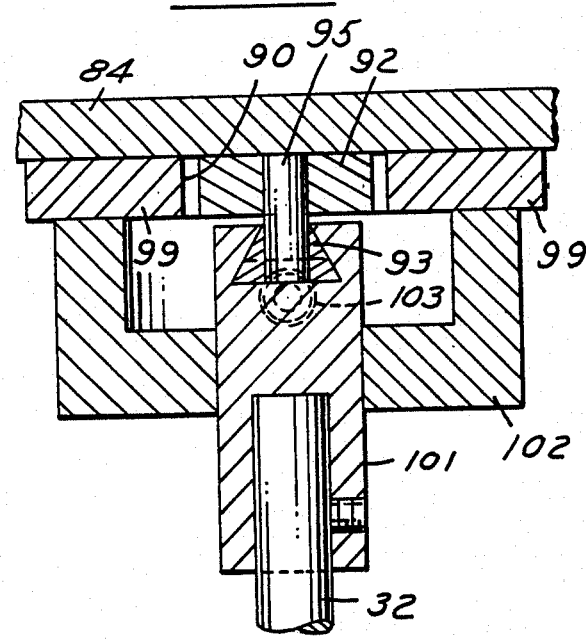

FIG. 6, a detailed sectional view of the cam mechanism.

Figure 7:
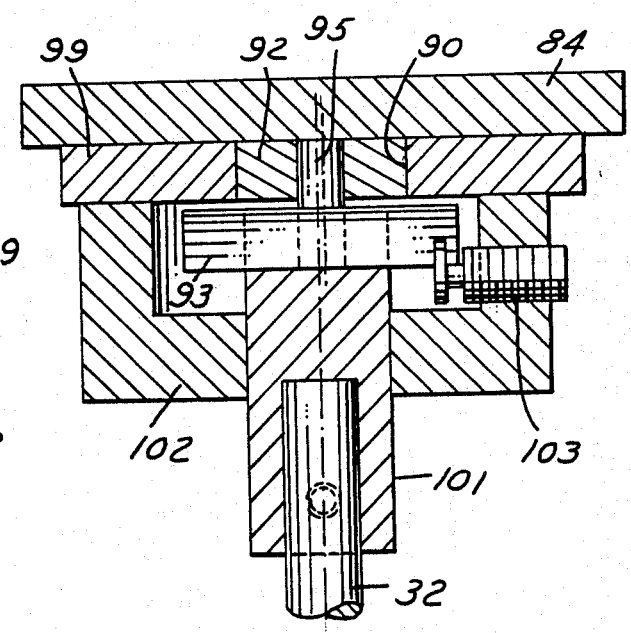

FIG. 7, a sectional view similar to FIG. 6 but rotated 90°.

Figure 8:
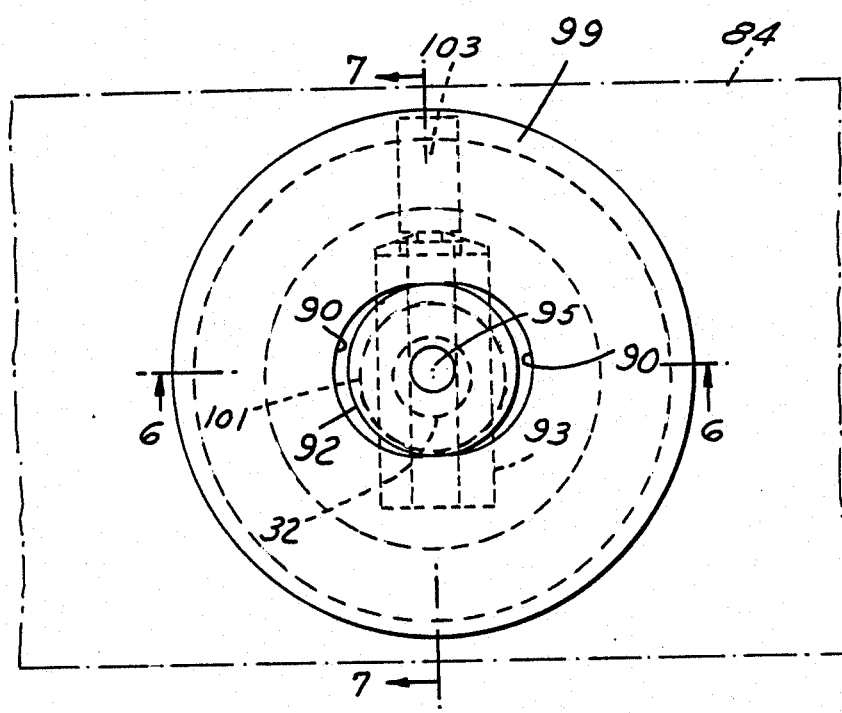

FIG. 8, a top view of the reciprocating mechanism illustrating the adjustment mechanism.

DETAILED DESCRIPTION OF THE PRINCIPLES OF THE INVENTION AND THE MANNER AND PROCESS OF USING IT

In FIG. 1, a side elevation of the apparatus incorporating the invention is illustrated. A primary base 20 for support on a horizontal surface has hinged to the forward edge thereof a secondary base 22 connected by hinges 24, or by a piano-type hinge. One or more adjustment screws 25 control the tilt adjustment of the secondary base 22 relative to the primary base 20.

The secondary base 22 has bolted thereto a forward upstanding column 30 which also serves as a motor housing for a variable speed motor within the housing having an output shaft 32. An elongate plate 34, through which the shaft 32 projects, is bolted to the top of the motor housing by bolts 36.

The plate 34 is supported rearwardly of the apparatus by a column 40 which positions the plate 34 in parallel relation to the secondary base 22. The column 40 is reduced in an extension 42 which passes through the plate 34 and has a pivotal support bolt 44. In FIG. 4, the column 42 is shown reduced at 46 to provide a top surface support 48 for a portion of a part chute to be described. The bolt 44 has a shoulder portion 50 to contact the top surface 48.

With reference again to FIGS. 1 and 2 and 5, at the rearward end of plate 34 is a shaft 60 with a threaded end captured by two nuts 62 so that the shaft is rigidly held in upright position. Mounted on the shaft 60 is knuckle fixture 64 which is vertically slidable on shaft 60. Another portion of the knuckle 64 receives a horizontal shaft 66. A nut 68, when tightened, clamps the knuckle 64 on both shafts 60 and 66. On the distal end of shaft 66 is a hopper 70 with a wide mouth at the top and funnel opening 72 at the bottom. Thus, it will be seen that the hopper may be adjusted vertically on shaft 60 and horizontally by movement of shaft 66.

A part feeder and aligned trough 80, U-shaped in cross-section, has preferably a circular or elliptical shape at the bight 82 of the trough. As shown in FIG. 2, a plate 84 underlies the trough and U-shaped bolts 86 clamp the plate 84 against the bottom of the trough. Attached to the plate 84 is a sub-plate 99 which has an elongate recess 90 in which a cam 92 is positioned mounted on bar 93. The bar 93 is attached to a dovetail coupling 101 on motor shaft 32 (FIGS. 6 and 7). The bar 93 can be adjusted by a special screw 103 in the inverted cup 102 attached to coupling 101. This adjustment allows the change of eccentricity of the cam in relation to the axis of shaft 32. The trough has side notches 94 which locate cross plates 98 through which the legs of the U-bolts 86 extend and are secured by nuts 96. Cross plates 98 span the legs of the bolts as illustrated in FIG. 2.

At the discharge end of the trough 80 is a spring 100 seated at each end respectively in a recess in the plate 34 and the plate 84 acting to float the reciprocating end of plate 84 to eliminate contact of the bearing mounted to the cam 92.

As viewed in FIGS. 1 and 4, the plate 84, underlying the trough 88, is seated on the column 42 and positioned by the portion 46 in pivotal relationship. Shoulder bolt 44 secures the parts in this position.

On the secondary base 22 is an electric control box 110 with an adjustment knob 112. This box is associated electrically with the variable speed electric motor within the housing column 30 so that the speed of the motor shaft and the revolving cam 92 may be carefully controlled.

The pivotal mount of the trough 80 and the plate 84 at column 42 and the locating of the cam 92 within the opening 90 in sub-plate 99 make it possible to reciprocate the discharge end of trough 80 rapidly. In addition, the angle of the trough can be adjusted by the screw 25 acting on the secondary plate 22.

In FIG. 6, a sectional view illustrates the motor shaft 32 which mounts coupling 101 carrying the inverted cup 102. In the coupling 101, the bar 93 is slidably positioned in a dovetail groove. The cam 92 is mounted on a pin 95 carried by the bar 93. An adjustment screw 103 shown in FIGS. 7 and 8 has one end rotatably engaged with the bar 93. The screw is threadably mounted in part 102 so that rotation of the screw will shift the bar 93 and the position of the cam in the opening 90.

As previously indicated, the hopper 70 can be raised or lowered on the shaft 60 and moved forward and aft on the shaft 66.

In operation, fungible goods such as nuts, bolts, washers, seeds, pills or powder can be introduced into the hopper where they will be fed into the trough 80. Reciprocation of the trough in conjunction with the action of gravity on the declined trough will cause the parts to align as they progress toward the discharge end. Thus, the parts will discharge one at a time at the trough and into whatever container is provided. Seeds may be deposited into an envelope package or a strip package. Nuts, washers, or bolts can be packaged conveniently because of the individual discharge.

One example of the use of the dispenser was the dispensing of small fuel injector nozzles fed to a three-inch diameter trough disposed at a three degree (3°) angle to horizontal. The motor was operated at 1000 R.P.M. The reciprocation displacement at the end of the trough was 0.125 T.I.R. (Total Indicator Reading). Each RPM of the motor is one reciprocation of the trough. The discharge rate at the end of the trough was one part per second.

A second example involved the use of a one-inch diameter trough for feeding small copper rings formed at 0.275" diameter from 0.025 wire. The trough angle was at a four degree 4° (angle) to horizontal. The discharge rate was one part per second. The motor was operated at 1600 RPM which results in 1600 reciprocations per minute. The total reciprocation displacement at the discharge end of the trough was 0.020" which was the Total Indicator Reading (T.I.R.).

With the various adjustments of the hopper, angle of inclination, speed of reciprocation, length and cross-section of the trough, cam adjustment to control horizontal displacement, many different parts can be aligned and discharged as desired. The length and diameter of the trough will vary with the size and shape of the media being fed.

What is claimed is:

1. A part feeder for fungible goods to feed parts out of a trough in single file alignment which comprises:
    (a) a mounting means,
    (b) a trough on said mounting means having a U-shaped cross-section and having a receiving portion and a discharge end,
    (c) means mounting said trough in a region near the receiving portion for pivotal movement on a vertical axis,
    (d) means on said mounting means engaged with said trough adjacent the discharge end to reciprocate said discharge end horizontally to impart a vibration to goods in said trough to align said goods for single file discharge from said trough,
    (e) said mounting means comprising a primary support base, a secondary base movably supported on said primary base, means to adjust said secondary base on said primary base to change the position of said secondary base relative to horizontal, and spaced first and second support columns on said secondary base, respectively, to mount said trough,
    (f) said first column including a motor housing having an output shaft extending to said trough, means forming a cam recess on said trough, and a cam means on said output shaft positioned in said cam recess to impart a horizontal reciprocation to said trough at the discharge end, and
    (g) said cam means being mounted in a slide bar, and said slide bar being mounted on said motor output shaft for horizontal adjustment relative to the axis of rotation of said shaft to alter the eccentricity of said cam relative to said cam recess.

2. A part feeder for fungible goods to feed parts out of a trough in single file alignment which comprises:
    (a) a mounting means,
    (b) a trough on said mounting means having a U-shaped cross-section and having a receiving portion and a discharge end,
    (c) means mounting said trough in a region near the receiving portion for pivotal movement on a vertical axis,
    (d) means on said mounting means engaged with said trough adjacent the discharge end to reciprocate said discharge end horizontally to impart a vibration to goods in said trough to align said goods for single file discharge from said trough,
    (e) said mounting means adjacent the discharge end of said trough comprising a resilient means to permit horizontal reciprocation of said discharge end, means forming a cam recess below said trough, a cam to rotate eccentrically within said recess, a motor having rotating output shaft, an adaptor post on said shaft having a slide recess, a cam support bar in said slide recess having means to support said cam, means encircling said adaptor post, and an adjustment screw on said encircling means engaged with said cam support bar to move said bar relative to the center of rotation of said motor output shaft.

* * * * *